United States Patent Office 3,144,015
Patented Aug. 11, 1964

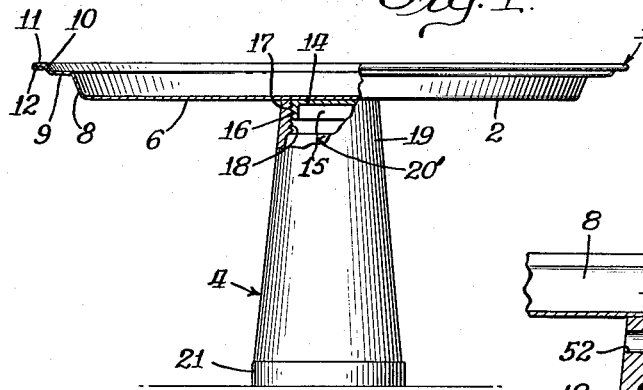
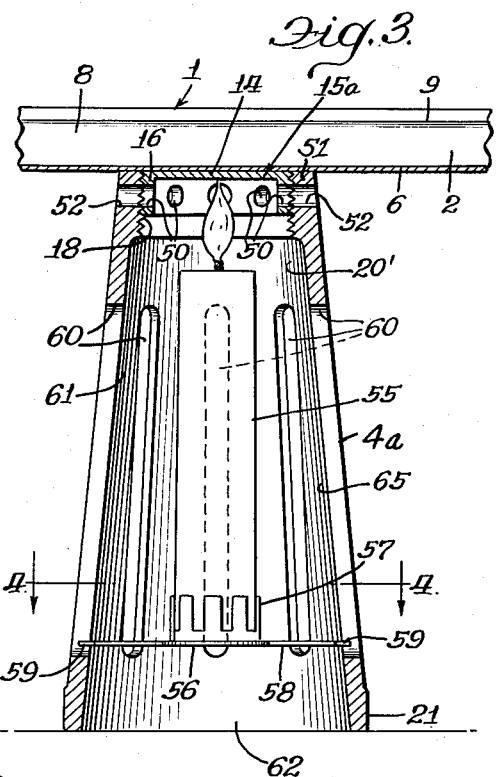
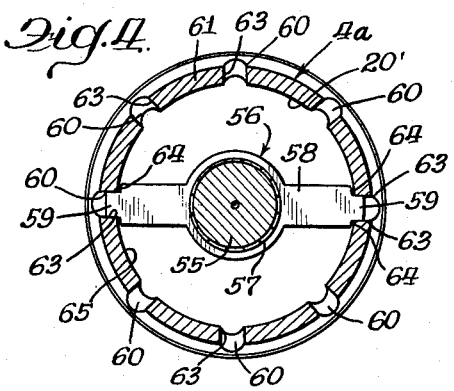
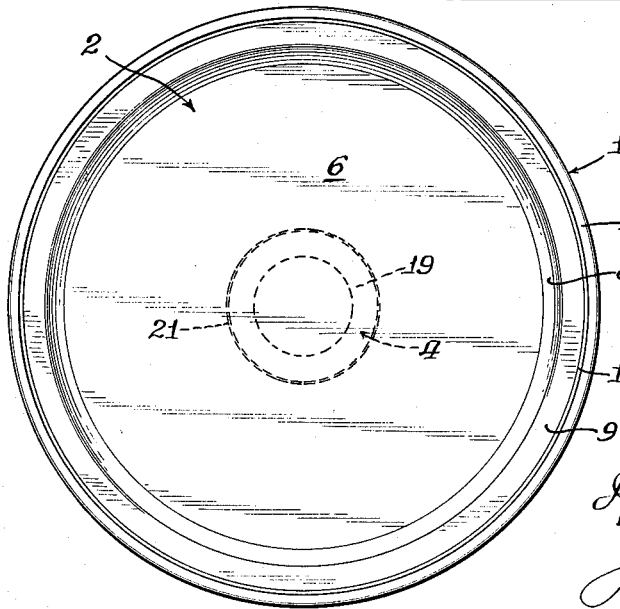

3,144,015
PIZZA BRACER AND SUPPORT
John J. Jankowski, 2621 W. Attrill, Chicago, Ill.
Filed July 17, 1962, Ser. No. 210,473
6 Claims. (Cl. 126—261)

This invention relates to a novel holder for a pizza or other viands, which in addition to providing an extensive area for backing the pizza, also serves as an elevated support therefor to permit placement of different dishes thereunder.

Pizza, as is well known to those skilled in the art, is a pastry of Italian origin generally of annular shape having a thin wafer-like dough bottom topped with meat or cheese and the like. In recent years pizza has become very popular and the general object of the invention is to provide a novel holder therefor.

The invention contemplates the provision of a conical heavy base portion which is threaded at its upper end and screws to a flat, edge rimmed, plate-like top, which is adapted to be rotated to permit serving to different persons about the table.

In one embodiment of the invention there is provided in the base portion, a heating means in the form of a candle or other fired substance, the base portion being provided with air vents and the connection between the plate portion and the base being relatively rotatable to open and close certain air vents to control the combustion of the burning substance.

A further object of the invention in one embodiment thereof is to provide combination venting means which are in the form of vertically elongated slots in the sides of the hollow base portion and which admit locking lugs of a holder for the heating element, such as a candle, and wherein the holder is vertically adjustable to position the heater at optimum or desired position to regulate the heating of the plate portion carried by the base.

These and other objects and advantages inherent in and encompassed by the invention will become more readily apparent from the specifications and the drawings wherein:

FIGURE 1 is a side elevational view partly in vertical section of one embodiment of the invention;

FIGURE 2 is a plan view of the structure of FIGURE 1;

FIGURE 3 is a fragmentary vertical sectional view of another embodiment of the invention, and FIGURE 4 is a transverse sectional view taken substantially on line 4—4 of FIGURE 3.

Description of the Invention

Describing the invention in detail with particular reference to FIGURES 1 and 2, there is shown a viand holder 1 including an upper supported plate portion 2 and a lower supporting base portion 4.

The plate portion 2 comprises a flat bottom 6 terminating in the bottom edge of an annular frusto-conical rim 8 which at its upper edge merges into the inner edge of an annular generally horizontal flange 9 which at its outer edge merges into the lower edge of annulus 10 which at its upper edge is formed with an outturned flange 11 which is formed with an outer edge bead 12. The pizza (not shown) is adapted to nest within the rim 8 on the bottom 6 and the flange 9 may provide a support for a cover, if desired.

At the center of the plate portion 2 there is secured by welding, soldering or brazing, the end wall 14 of the plug or threaded male element 15 which has a dependent cylindrical portion 16 with external threads 17 which screw into the threaded bore 18 at the upper end 19 of the base portion 4.

The base portion 4 is hollow and generally frusto-conical in form and has an internal heat focusing bore 20' and broadens downwardly and at its base end 20 is provided with a ring portion 21.

In the present embodiment of the invention the upper plate portion is formed of metal as is the base. The bottom 6 is a relatively thin sheet of metal and has a high coefficient of heat transfer such that upon placing a hot pizza upon the plate, the heating quickly expands the plug 15 which also is a thin shell and thus tightly locks the plug to the base. Thus the plate and base are prevented from being readily rotatable relative to each other and to rotate the plate, it is necessary to rotate the entire holder, thus preventing accidental separation. When the food is eaten, the plate and plug cool, loosening the connection of the plate to the heavy base, whereby the two pieces may be unscrewed and separated for washing and convenient storage. If desired, an electrical heating element may be placed within the holder.

Embodiment of FIGURES 3 and 4

In the embodiment of FIGURES 3 and 4, it will be noted that the structure is similar to that previously considered and therefore like parts will be identified by corresponding reference numerals. In the instant modification, the plug 15a has in its cylindrical portion 16 a plurality of radial openings 50 and that the upper end portion 51 of the base 4a is provided with a plurality of radial openings 52 which in certain positions are adapted to register with the openings 50 to provide vents to sustain combustion of the combustible such as the candle 55. It will be realized that the area of the vents is regulated by opening and closing of the vents by relative rotation of the plate and base to align and misalign the openings 50–52, thus controlling the rate of combustion of the heating element and thus regulating the thermal output into the plate to maintain the pizza or food warm over an extended period of time.

In the instant embodiment, the lower end of the candle is carried in a support 56 which has a center cupped holder 57 secured to a spring steel or resilient straddler or mounting element 58. The element 58 is a flat flexible element of generally rectangular shape with outwardly directed distal lugs 59, 59 which are dimensioned to enter the vertically elongated slots 60, 60 at diametrically opposite sides of the base 4a in the peripheral wall portion 61 thereof. It will be seen that the base portion 4a being conical has an upwardly tapering wall 61 and thus as the candle is elevated by the user by pushing upwardly through the open lower end 62, the mounting element 58 is bowed upwardly causing the lugs 59 to partly withdraw from the slots 60 and to move between the side edges 63, 63 thereof and move upwardly until pressure is relieved upon the element 58. The tendency of the element 58 to straighten out effects a wedging effect of the edges 64, 64 against the rough interior 65 of the wall 61 thus holding the candle in elevated position.

To withdraw the candle support from the base, the user grasps the support with his fingers and pulls down, thus bowing the element 58 downwardly and permitting the assembly to be withdrawn. It will be seen that the slots 60 together with the vent openings 50–52 provide a novel regulated heating plate for the food on the plate and that by rotating the plate and base to a position closing the vent openings 50–52 a novel arrangement for extinguishing the candle is provided.

It will be understood that several embodiments of the invention are disclosed for purposes of clearly presenting the invention and it will become readily apparent that various other forms of the invention are available to those skilled in the art within the scope of the appended claims.

I claim:

1. In a hot viand holder, a plate portion, a base portion therebeneath, means interlocking said portions, and means within the base portion for heating said interlocking means, said interlocking means being thermally responsive for locking said portions upon application of heat and releasable upon cooling and said means comprising interthreaded elements, and said elements having registering openings providing vents, and combustible means within the base portion having an exhaust through said vents.

2. The invention according to claim 1 and said elements being readily relatively movable when cool for varying the area of said vents for controlling the rate of combustion of said combustible means.

3. In a hot viand holder, the combination of a top plate portion and a supporting base portion, said base portion being hollow and having an upper threaded bore, a hollow threaded member connected to said plate portion threaded into the bore, said member being hollow and having radial openings and said base portion having openings registering with said radial openings, said base having vertical vent slots, a combustible holder comprising a flexible mounting member extending diametrically of the base and having end lugs projecting to respective slots, said mounting member being transversely flexible to withdraw said lugs from the slots for positioning at different elevations within said base.

4. The invention according to claim 3 and said threaded member being expandable upon application of heat thereto for tightly locking said portions to each other.

5. In a viand holder, the combination of a generally horizontal plate portion and a generally vertical support stand at the center of said portion, means on said portion and stand rotatably interlocking the same, said means including a thin nipple-like member connected with the plate portion, a heating element within the stand, said stand having a conical bore tapering toward said member in heat focusing relation thereto, said member being expandable upon application of heat thereto for interlocking the base with the plate portion and conducting heat to said plate portion, and said stand having a peripheral wall of generally frusto-conical form and said wall having a plurality of vertical slots therein, and a heating element holder vertically adjustable within said slots.

6. In a holder, the combination of a top and a base portion connected to the center of the top, said base portion having a conical heat-focusing bore therein and said bore defined by a peripheral wall having a generally rough interior surface and vertically elongated slots, and a heater-element holder within the bore comprising a flexible mounting strip extending diametrically across the bore and having means entering into the slots for positioning the same in the bore.

References Cited in the file of this patent

UNITED STATES PATENTS

| | | |
|---|---|---|
| 896,719 | Gerbrecht et al. | Aug. 25, 1908 |
| 944,307 | Bauer | Dec. 28, 1909 |
| 1,106,176 | Wormser | Aug. 4, 1914 |
| 1,388,622 | Voorhees | Aug. 23, 1921 |
| 1,919,407 | Wood | July 25, 1933 |
| 2,441,131 | Blackman et al. | May 11, 1948 |
| 2,681,056 | Fischl | June 15, 1954 |
| 3,045,855 | Lipman | July 24, 1962 |